US009065541B2

(12) United States Patent
Rofougaran et al.

(10) Patent No.: US 9,065,541 B2
(45) Date of Patent: Jun. 23, 2015

(54) CONFIGURABLE WIRELESS COMMUNICATION DEVICE WITH CONFIGURABLE FRONT-END

(71) Applicant: BROADCOM CORPORATION, Irvine, CA (US)

(72) Inventors: Ahmadreza Rofougaran, Newport Coast, CA (US); Alireza Tarighat Mehrabani, Irvine, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 106 days.

(21) Appl. No.: 14/041,062

(22) Filed: Sep. 30, 2013

(65) Prior Publication Data

US 2015/0072671 A1    Mar. 12, 2015

Related U.S. Application Data

(60) Provisional application No. 61/875,810, filed on Sep. 10, 2013.

(51) Int. Cl.
*H04B 1/44* (2006.01)
*H04B 7/06* (2006.01)

(52) U.S. Cl.
CPC .............. *H04B 1/44* (2013.01); *H04B 7/0617* (2013.01)

(58) Field of Classification Search
USPC ................ 455/78, 418, 446, 458; 370/278
See application file for complete search history.

(56) References Cited

U.S. PATENT DOCUMENTS

| | | | | |
|---|---|---|---|---|
| 5,966,662 | A * | 10/1999 | Murto | 455/458 |
| 8,804,566 | B1 * | 8/2014 | Singh et al. | 370/252 |
| 2004/0232982 | A1 * | 11/2004 | Ichitsubo et al. | 330/129 |
| 2007/0066245 | A1 * | 3/2007 | Snider | 455/78 |
| 2007/0225033 | A1 * | 9/2007 | Yoon et al. | 455/552.1 |
| 2008/0231357 | A1 * | 9/2008 | Zolfaghari | 330/51 |
| 2008/0280581 | A1 * | 11/2008 | Rofougaran et al. | 455/296 |
| 2008/0297404 | A1 * | 12/2008 | Lin et al. | 342/195 |
| 2010/0041393 | A1 * | 2/2010 | Kwon et al. | 455/426.1 |
| 2010/0136922 | A1 * | 6/2010 | Rofougaran | 455/73 |
| 2010/0210288 | A1 * | 8/2010 | Kim et al. | 455/458 |
| 2010/0216412 | A1 * | 8/2010 | Rofougaran | 455/78 |
| 2010/0227627 | A1 * | 9/2010 | Ishii et al. | 455/456.2 |
| 2010/0238075 | A1 * | 9/2010 | Pourseyed | 343/702 |
| 2010/0279697 | A1 * | 11/2010 | Yang et al. | 455/446 |
| 2011/0143783 | A1 * | 6/2011 | Lee et al. | 455/458 |
| 2011/0299431 | A1 * | 12/2011 | Mikhemar et al. | 370/277 |
| 2011/0299433 | A1 * | 12/2011 | Darabi et al. | 370/277 |

(Continued)

*Primary Examiner* — Nathan Taylor
(74) *Attorney, Agent, or Firm* — Garlick & Markison; Bruce E. Garlick (57) ABSTRACT

A configurable wireless communication device includes a baseband processing module, a transmitter section, a receiver section, an antenna, transmit/receive isolation circuits, high frequency switches, and a configuration module. The baseband processing module converts outbound data into an outbound symbol stream and converts an inbound symbol stream into inbound data. The transmitter section converts the outbound symbol stream into an outbound signal and the receiver section converts an inbound signal into the inbound symbol stream. The configuration module, in a power combining mode, couples, via a set of high frequency switches, the antenna to a set of transmit/receive isolation circuits, wherein a number of the transmit/receive isolation circuits in the set of transmit/receive isolation circuits is based on a desired combined transmit power.

20 Claims, 7 Drawing Sheets

(56) References Cited

U.S. PATENT DOCUMENTS

| | | | |
|---|---|---|---|
| 2011/0299435 A1* | 12/2011 | Mikhemar et al. | 370/278 |
| 2011/0299437 A1* | 12/2011 | Mikhemar et al. | 370/278 |
| 2011/0300853 A1* | 12/2011 | Darabi et al. | 455/422.1 |
| 2011/0300885 A1* | 12/2011 | Darabi et al. | 455/500 |
| 2014/0094171 A1* | 4/2014 | Tanaka et al. | 455/435.1 |

* cited by examiner

CONFIGURABLE WIRELESS COMMUNICATION DEVICE WITH CONFIGURABLE FRONT-END

CROSS REFERENCE TO RELATED PATENTS

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Application Ser. No. 61/875,810, entitled "CONFIGURABLE WIRELESS COMMUNICATION DEVICE WITH CONFIGURABLE FRONT-END," filed Sep. 10, 2013.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND

1. Technical Field

The present disclosure relates generally to wireless communications and more particularly to configurable wireless communication devices.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system operates in accordance with one or more communication standards. For instance, wireless communication systems may operate in accordance with one or more standards including, but not limited to, IEEE 802.11, Bluetooth, global system for mobile communications (GSM), code division multiple access (CDMA), local multi-point distribution systems (LMDS), radio frequency identification (RFID), Enhanced Data rates for GSM Evolution (EDGE), General Packet Radio Service (GPRS), WCDMA, LTE (Long Term Evolution), WiMAX (worldwide interoperability for microwave access), and/or variations thereof.

Depending on the type of wireless communication system, a wireless communication device, such as a cellular telephone, two-way radio, personal digital assistant (PDA), personal computer (PC), laptop computer, computer tablet, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system or a particular RF frequency for some systems) and communicate over the channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. As is also known, the transmitter includes a data modulation stage, one or more intermediate frequency stages, and a power amplifier.

To implement a radio transceiver, a wireless communication device includes a plurality of integrated circuits (ICs) and a plurality of discrete components. For example, a wireless communication device that supports 2G, 3G, and/or 4G cellular telephone protocols includes a baseband processing IC, a power management IC, a radio transceiver IC, a transmit/receive (T/R) switch, an antenna, and a plurality of discrete components. The discrete components include surface acoustic wave (SAW) filters, power amplifiers, duplexers, inductors, and capacitors. Such discrete components add several dollars (US) to the bill of material for the wireless communication device, but are necessary to achieve the strict performance requirements of the 2G, 3G, and/or 4G protocols.

DETAILED DESCRIPTION

Figure 1:
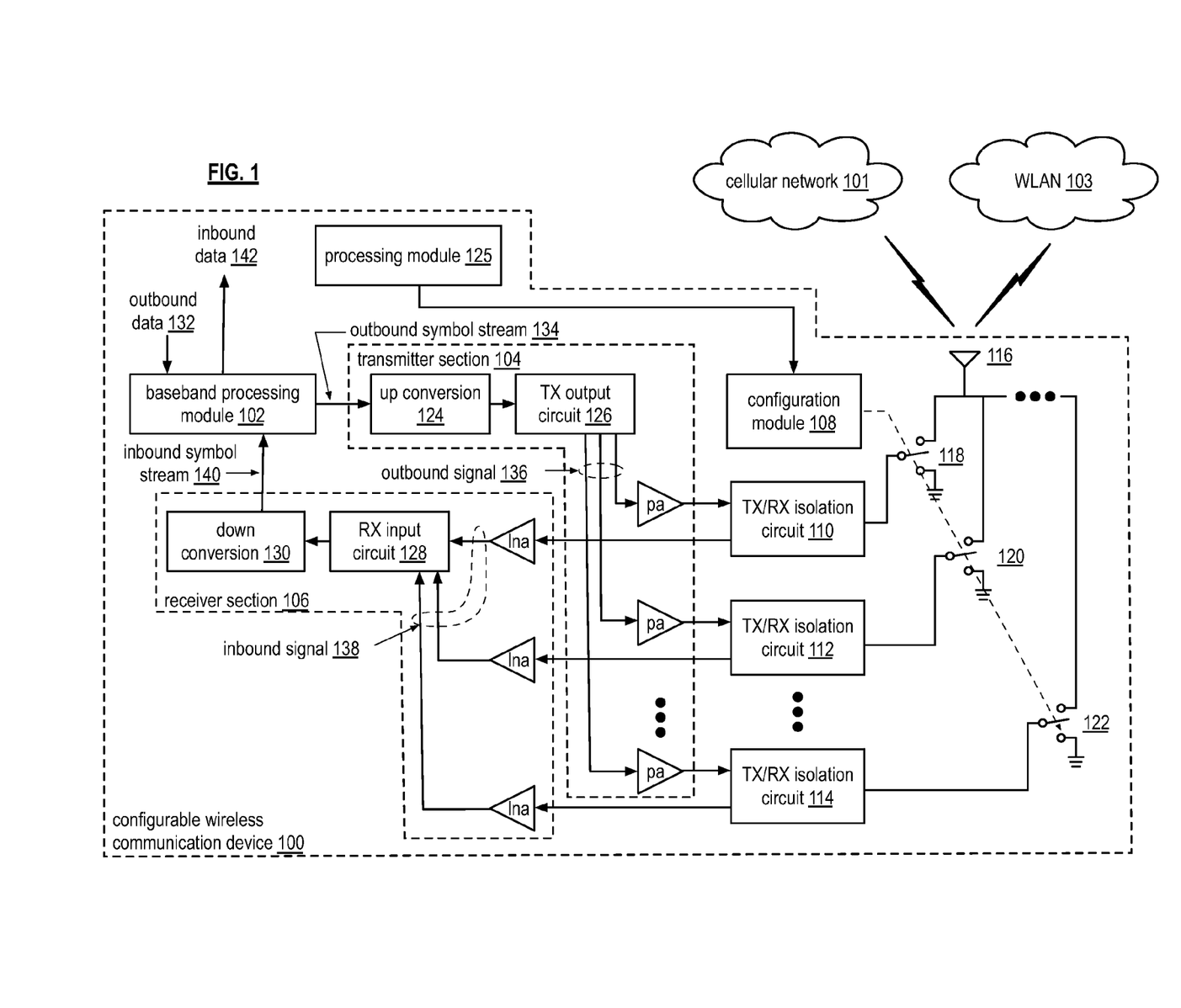
FIG. 1 is a schematic block diagram of an embodiment of a wireless communication device in accordance with the present disclosure.

FIG. 1 is a schematic block diagram of an embodiment of a configurable wireless communication device 100 that includes a processing module 125, a baseband processing module 102, a transmitter section 104, a receiver section 106, a configuration module 108, a plurality of transmit/receive isolation circuits 110-114, a plurality of high frequency switches 118-122, and an antenna 116. The transmitter section 104 includes an up conversion circuit 124, a transmit output circuit 126, and a plurality of power amplifiers (pa). The receiver section 106 includes a plurality of low noise amplifiers (lna), a receiver input circuit 128, and a down conversion circuit 130. The antenna 116 may include one or more antennas configured in: one or more arrays, multiple input multiple output (MIMO) antenna array, one or more diversity antennas, and/or a combination thereof. The device 100 may further include a semiconductor substrate (e.g., silicon substrate, CMOS substrate, etc.) that supports the transmit/receive isolation circuits 110-114, the power amplifiers (pa), and the noise amplifiers (lna).

The wireless communication device 100 may be a portable device, which may be any device that can be carried by a person, can be at least partially powered by a battery, and/or performs one or more software applications. For example, a portable device may be a cellular telephone, a laptop computer, a personal digital assistant, a video game console, a video game player, a personal entertainment unit, a tablet computer, etc. In addition, the wireless communication device 100 may operate in the radio frequency (RF) frequency band spectrum and/or the millimeter wave (MMW) frequency band spectrum.

In an example of operation, the baseband processing module 102 performs one or more functions to transmit outbound data 132 (e.g., voice, text, audio, video, graphics, etc.). The baseband processing module 102 converts the outbound data 132 into one or more outbound symbol streams 134 in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the baseband processing module 102 converts the outbound data 132 into a single outbound symbol stream 134 for Single Input Single Output (SISO) communications and/or for Multiple Input Single Output (MISO) communications and converts the outbound data 132 into multiple outbound symbol streams 134 for Single Input Multiple Output (SIMO) and Multiple Input Multiple Output (MIMO) communications.

The baseband processing module 102 provides the outbound symbol stream(s) 134 to the up conversion circuit 124, which converts the outbound symbol stream(s) 134 into one or more up converted signals (e.g., signals in one or more frequency bands 800 MHz, 1800 MHz, 1900 MHz, 2000 MHz, 2.4 GHz, 5 GHz, 60 GHz, etc.). The up conversion circuit 124 may have a direct conversion topology or a super-heterodyne topology and may include discrete digital components and/or analog circuitry. In addition, the up conversion circuit 124 may receive and process the outbound symbol stream(s) 134 as Cartesian coordinates, as polar coordinates, and/or as hybrid polar-Cartesian coordinates.

The transmit (TX) output circuit 126 receives the one or more up converted signals and provides them to one or more of the power amplifiers (pa). The transmit output circuit 126 may include a splitter for providing an up converted signal to multiple power amplifiers such that, when the signals are transmitted, they are combined in air, which increases the transmit power. In this manner, one or more of the expensive discrete components (e.g., surface acoustic wave (SAW) filters, off-chip power amplifiers, duplexers, inductors, and/or capacitors) may be omitted.

In addition, or in the alternative, the transmit output circuit 126 may include one or more phase shift circuits to phase shift the one or more up converted signals to facilitate beamforming. The transmit output circuit 126 may further include, or include in the alternative, a polar coordinate drive to facilitate polar coordinate outbound signals 136.

Regardless of the specific implementation of the transmit output circuit 126, one or more power amplifiers receives the up-converted signal(s) and amplifies them to produce outbound signal(s) 136. The power amplifier(s) provide the outbound signal(s) 136 to one or more of the transmit/receive isolation circuits 110-114, which function to isolate the outbound signals 136 from inbound signals 138. Examples of the transmit/receive isolation circuits 110-114 will be discussed with reference to FIGS. 3 and 4.

The configuration circuit 108, based on a control signal from the processing module 125, enables one or more of the high frequency switches to couple the antenna 116 to one or more of the transmit/receive isolation circuits 110-114. When coupled to the transmit/receive isolation circuit(s), the antenna 116 transmits the outbound signal 136. For example, in a power combining mode, the configuration module 108 couples, via a set (e.g., one or more) high frequency switches, the antenna 116 to a set (e.g., one or more) of transmit/receive isolation circuits 110-114, wherein the number of circuits in the set is based on a desired combined transmit power (e.g., higher more, more circuits being coupled).

In addition, the antenna receives one or more inbound signals 138 and provides the signal(s) 138 to the transmit/receive isolation circuit(s). The transmit/receive isolation circuit(s) provides the inbound signal(s) to one or more of the low noise amplifiers, which amplify the inbound signal(s) to produce amplified inbound signal(s). The low noise amplifier(s) provide the amplified inbound signal(s) to the receive (RX) input circuit 128, which is a complimentary circuit to the transmit output circuit 126. For instance, if the transmit output circuit 126 includes a splitter, the receive input circuit 128 includes a combiner.

The receive input circuit 128 provides the inbound signal to the down conversion circuit 130, which converts the inbound signal into one or more inbound symbol streams 140. The down conversion circuit 130 may have a direct conversion topology or a super-heterodyne topology and may include discrete digital components and/or analog circuitry. In addition, the down conversion circuit 130 may receive and process the inbound signals as Cartesian coordinates, as polar coordinates, and/or as hybrid polar-Cartesian coordinates.

The baseband processing module 102 converts the inbound symbol stream(s) 140 into inbound data 142 (e.g., voice, text, audio, video, graphics, etc.) in accordance with one or more wireless communication standards. Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the baseband processing module 102 converts a single inbound symbol stream 140 into the inbound data 142 for Single Input Single Output (SISO) communications and/or for Multiple Input Single Output (MISO) communications and converts multiple inbound symbol streams 140 into the inbound data 142 for Single Input Multiple Output (SIMO) and Multiple Input Multiple Output (MIMO) communications.

Figure 2:
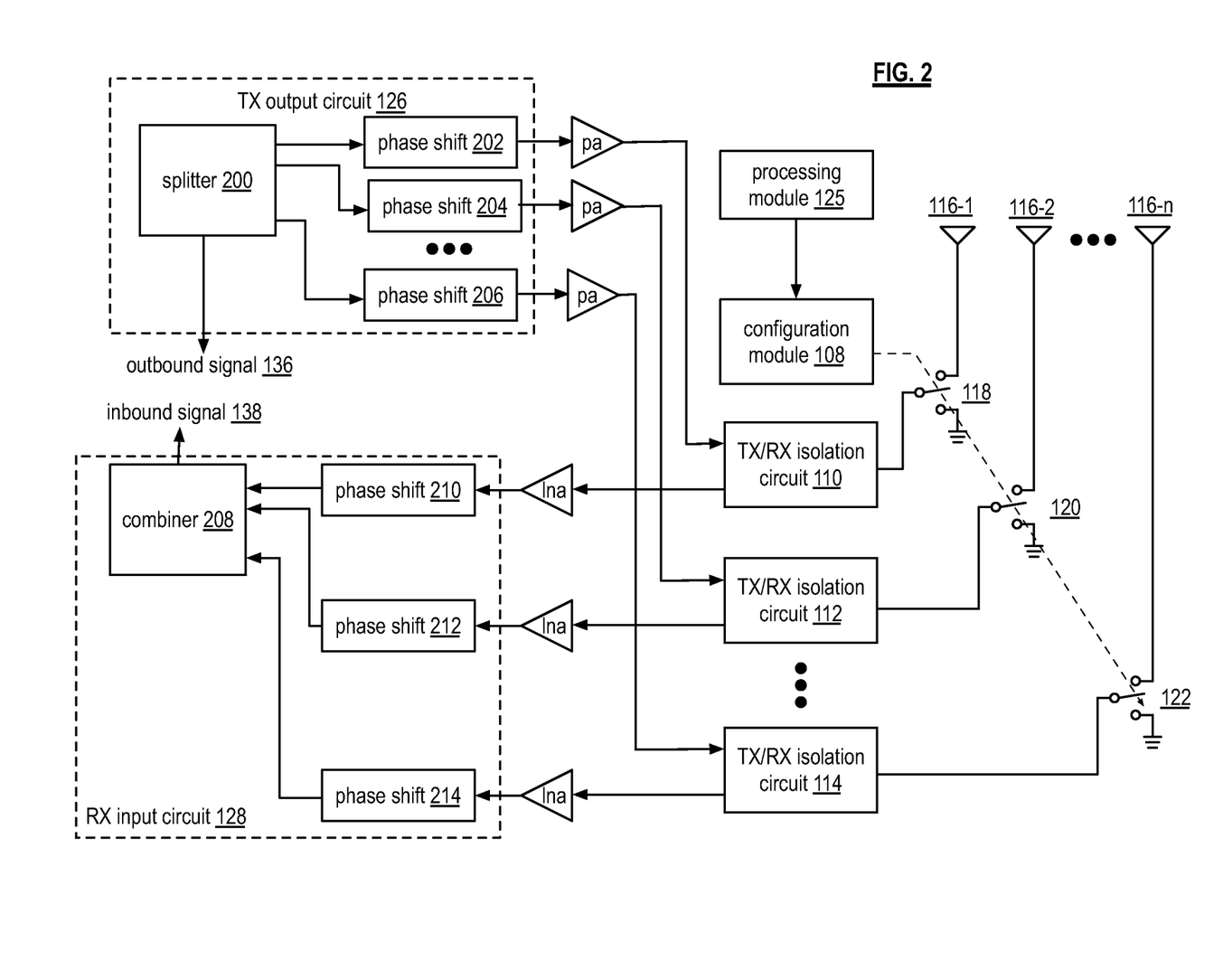
FIG. 2 is a schematic block diagram of an embodiment of a wireless communication device front end in accordance with the present disclosure.

FIG. 2 is a schematic block diagram of an embodiment of a wireless communication device front end that includes the transmit output circuit 126, the receive input circuit 128, the power amplifiers, the low noise amplifiers, the configuration module 108, the transmit/receive isolation circuits 110-114, the high frequency switches 118-122, and a plurality of antennas 116-1 through 116-n. Each of the antennas may be a single antenna, an antenna array, a diversity antenna, etc. The transmit output circuit 126 includes a splitter 200 and/or phase shift circuits 202-206 (e.g., phase shifters). The receive input circuit 128 includes a receive power combining circuit (e.g., combiner) 208 and/or phase shift circuits 210-214 (e.g., phase shifters).

In an example of operation, the configuration module 108 receives a beamforming control signal from the processing module 125 to place the wireless communication device in a beamforming mode. In this mode, the configuration module 108 couples a set (e.g., two or more) of antennas 116-1 through 116-n to a set (e.g., two or more) of transmit/receive isolation circuits 110-114 via a set (e.g., two or more) of high frequency switches 118-122.

In addition, the set of transmit/receive isolation circuits 110-114 are coupled to one or more adjustable phase shifters 202-206 of the transmit output circuit 126 and to one or more adjustable phase shifters 210-214 of the receive input circuit 128. The phase shifters 202-204 phase shift respective outbound signals received from the splitter 200 to produce phase shifted outbound signals. When the phase shifted outbound signals are transmitted via the set of antennas their radiation patterns combine in air to beamform the transmission of the outbound signal.

The set of antennas receives phase shifted inbound signals and provides them to the phase shifters 210-214 of the receive input circuit 128 via the set of transmit/receive isolation circuits 110-114. The phase shifters 210-214 shift respective ones of the phase shifted inbound signals to produce a set of inbound signals. The combiner 208 combines the set of inbound signals into the inbound signal 138.

In another example of operation, the configuration module 108 receives a power combining and beamforming control signal from the processing module 125 to place the wireless communication device in a power combining beamforming mode. In this mode, the configuration module 108 couples sets (e.g., two or more antennas per set) of antennas 116-1 through 116-n to sets (e.g., two or more circuits per set) of transmit/receive isolation circuits 110-114 via a set (e.g., two or more switches per set) of high frequency switches 118-122.

In addition, each set of transmit/receive isolation circuits 110-114 is coupled to the adjustable phase shifters 202-206 of the transmit output circuit 126 and to the adjustable phase shifters 210-214 of the receive input circuit 128. The phase shifters 202-204 phase shift respective outbound signals received from the splitter 200 to produce phase shifted outbound signals. Each of the phase shifted outbound signals is provided to a set of antennas via a corresponding of transmit/receive isolation circuits. The sets of antennas transmit the phase shifted outbound signals such that, in air, their radiation patterns combine in power and to beamform the outbound signal.

The sets of antennas receive phase shifted inbound signals and provide them to the sets of the phase shifters 210-214 of the receive input circuit 128 via the sets of transmit/receive isolation circuits. The phase shifters 210-214 shift respective ones of the phase shifted inbound signals to produce a set of inbound signals. The combiner 208 combines the set of inbound signals into the inbound signal 138.

Figure 3:
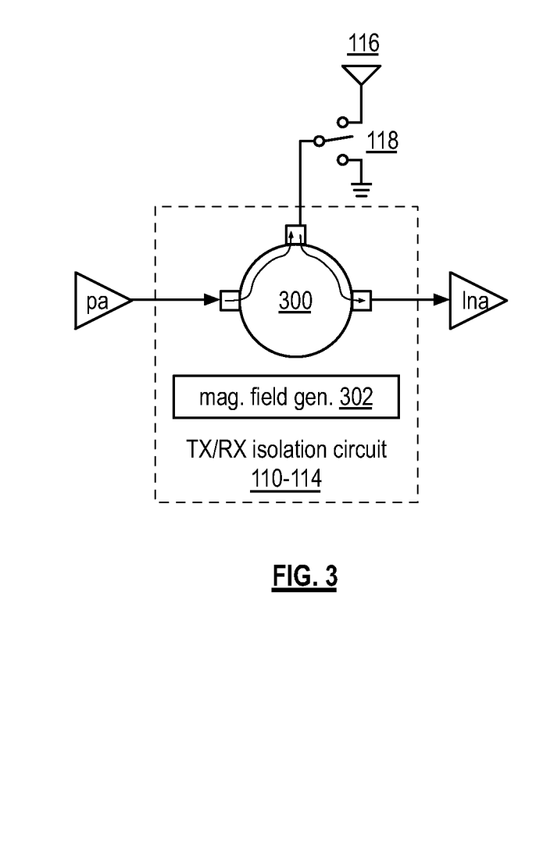
FIG. 3 is a schematic block diagram of an embodiment of a transmit/receive isolation circuit in accordance with the present disclosure.

FIG. 3 is a schematic block diagram of an embodiment of a transmit/receive isolation circuit 110-114 that includes a magnetic field biased circulator. The magnetic field biased circulator includes a circulator 300 and a magnetic field generator 302. The circulator 300 may be a waveguide implemented on one or more layers a substrate (e.g., integrated circuit (IC) die, IC package substrate, printed circuit board, etc.) having three ports. The magnetic field generator 302 is positioned above or below the circulator 300 and generates a magnetic field that allows electromagnetic signals to flow easily from port to port in one direction through the circulator 300 and substantially restricts the flow of the electromagnetic signals from port to port in the opposite direction.

In this example, the magnetic field generator 302 generates a magnetic field within the circulator 300 that allows electromagnetic signals to flow in clockwise direction. As shown, the power amplifier is coupled to a first port, the antenna 116 is coupled (via the switch) to a second port, and the low noise amplifier is coupled to a third port, where the ports are sequential in the clockwise direction. Thus, the outbound signal flows from the first port to the second port and the inbound signal flows from the second port to the third port with acceptable levels of isolation from the outbound signal (e.g., 20 dB or more isolation).

Figure 4:
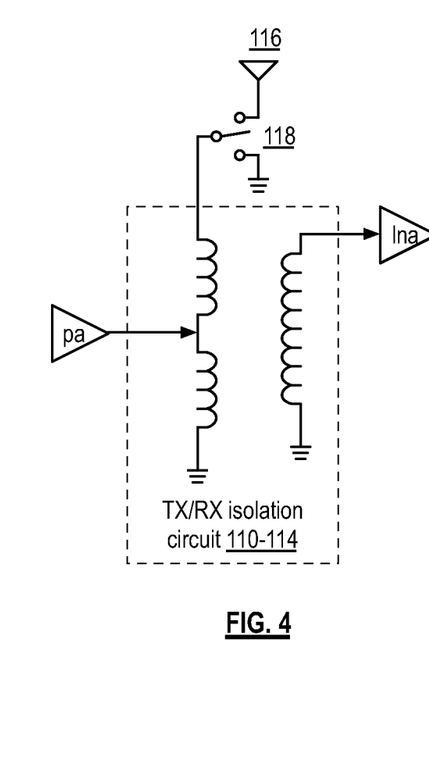
FIG. 4 is a schematic block diagram of another embodiment of a transmit/receive isolation circuit in accordance with the present disclosure.

FIG. 4 is a schematic block diagram of another embodiment of a transmit/receive isolation circuit 110-114 that includes a transformer. The transformer includes a center-tapped first winding and a second winding. A first end of the center-tapped first winding is coupled to an antenna 116 via a high frequency switch 118. A center-tap of the center-tapped first winding is coupled to the power amplifier and the other end of the center-tapped first winding is coupled to ground or to an adjustable impedance matching circuit. The second winding is coupled to the low noise amplifier, which may be done in a single-ended mode as shown or in a different mode (both ends of the second winding are inputs to a differential low noise amplifier).

In an example of operation, the power amplifier provides an outbound signal to the center tapped winding, where the current is split between the two legs of the center-tapped winding. The currents create opposite direction magnetic fields for the second winding and thus are substantially cancelled. An inbound signal received by the antenna 116 is provided to the center tapped winding. The current of the inbound signal on the center-tapped winding is magnetically coupled to the second winding and provided to the low noise amplifier.

Figure 5:
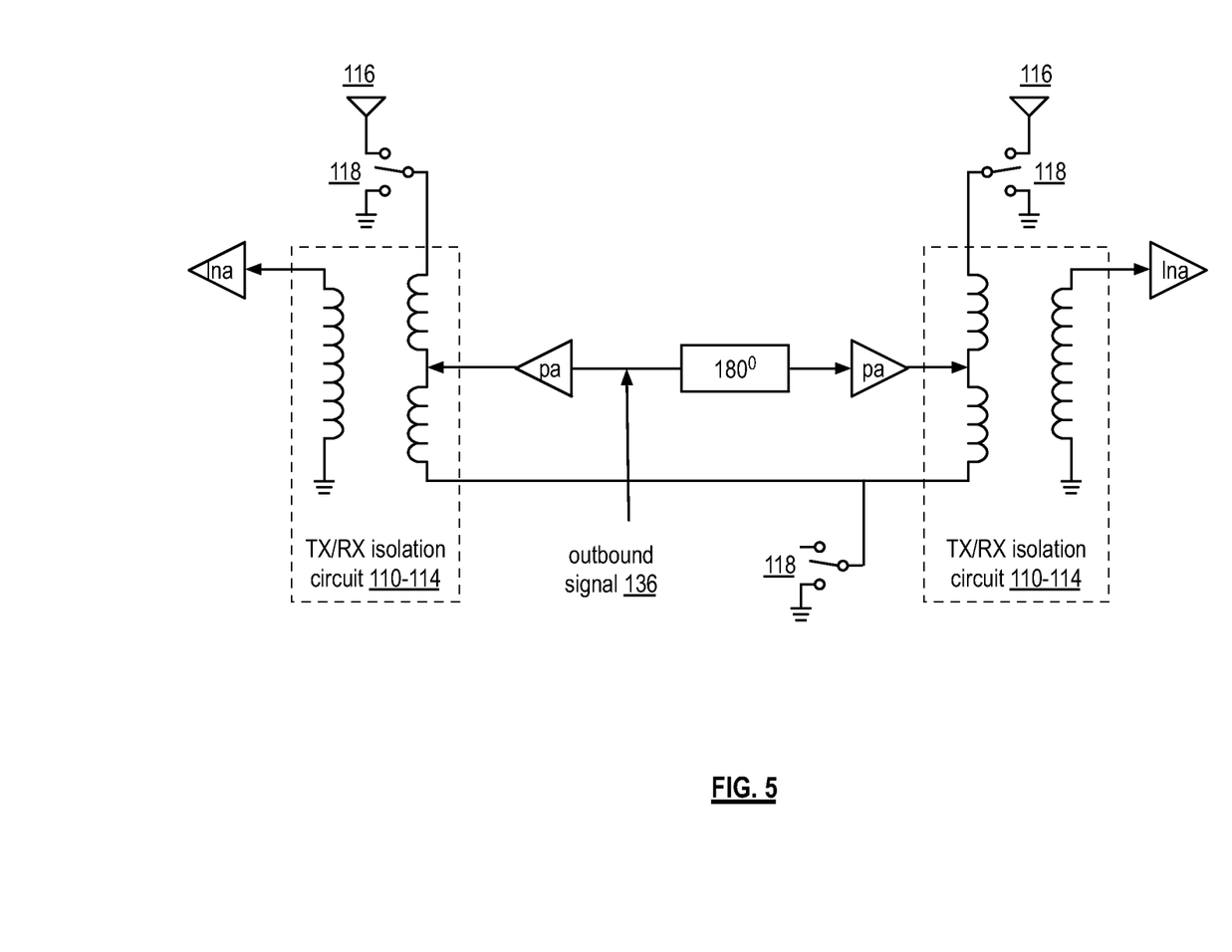
FIG. 5 is a schematic block diagram of another embodiment of a transmit/receive isolation circuit in accordance with the present disclosure.

FIG. 5 is a schematic block diagram of another embodiment of two transmit/receive isolation circuits implemented via transformers of FIG. 4. In the implementation of FIG. 4, the current provided by the power amplifier to ground via the lower half of the center-tapped winding is dissipated (i.e., it is lost). In the configuration of FIG. 5, this current is not lost, but coupled between two transmit/receive isolation circuits.

In an example of operation, the transmit/receive isolation circuit on the left receives a non-inverted outbound signal 136 and the one on the right receives an inverted outbound signal 136 via the 180 degree phase shift module. As such, the currents in the center-tapped windings are equal, but have opposite phase and cancel each other.

Figure 6:
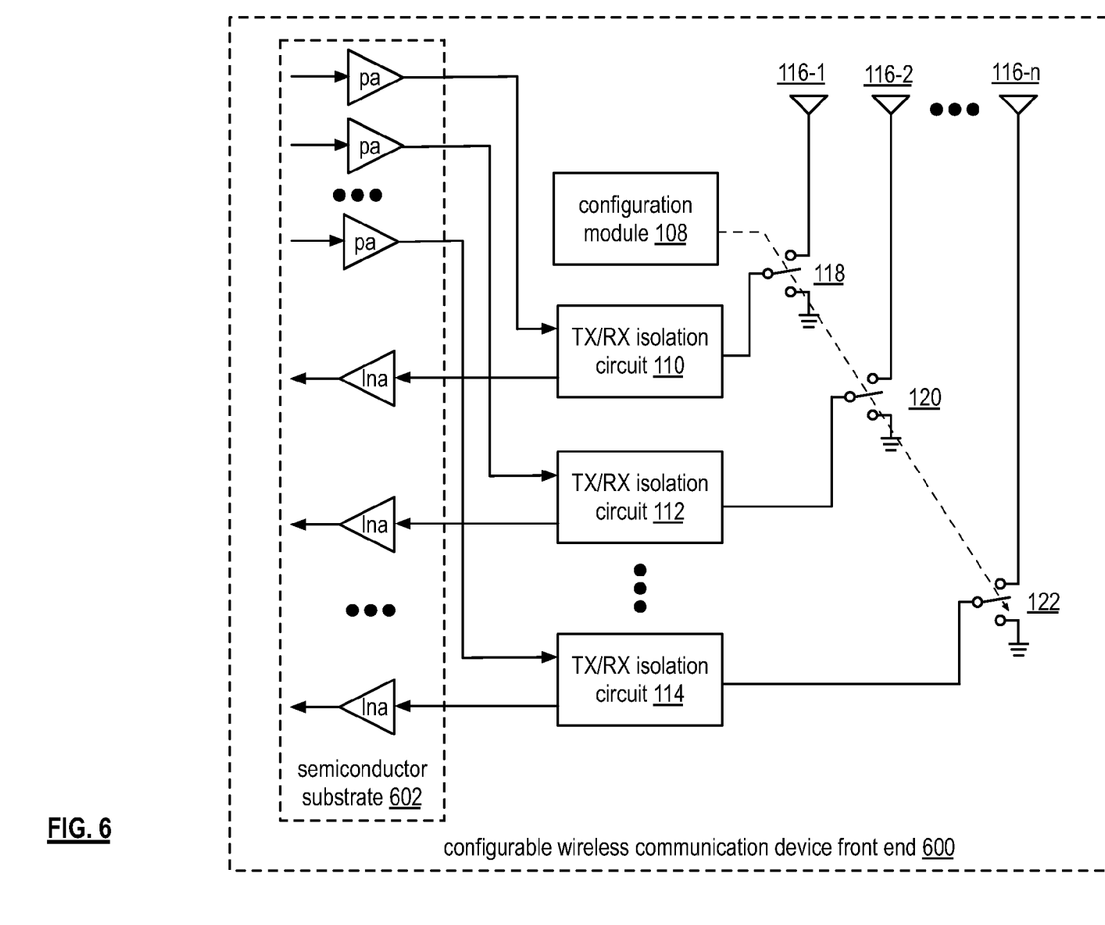
FIG. 6 is a schematic block diagram of another embodiment of a wireless communication device front end in accordance with the present disclosure.

FIG. 6 is a schematic block diagram of another embodiment of a wireless communication device front end 600 that includes a semiconductor substrate 602, the configuration module 108, the transmit/receive isolation circuits 110-114, the high frequency switches 118-122, and the antennas 116-1 through 116-n. The semiconductor substrate 602 (e.g., a silicon substrate, CMOS substrate, etc.) supports the power amplifiers and the low noise amplifiers. In addition, the semiconductor substrate 602 may further support the plurality of transmit/receive isolation circuits 110-114.

In an example of operation, the configuration module 108 receives a command for a power combining mode. In this mode, the configuration module couples, via a set of high frequency switches (e.g., two or more), an antenna 116-1 through 116-n to a set of transmit/receive isolation circuits 110-114. Accordingly, the energy of the outbound signals provided by the power amplifiers is combined prior to transmission by the antenna.

In an example of operation, the configuration module 108 receives a command for a beamforming mode. In this mode, the configuration module couples, via a set of high frequency switches, a set of antennas to a set of transmit/receive isolation circuits. In this manner, a set of phase shifted outbound signals is transmitted and combined, in air, to beamform the transmission.

Figure 7:
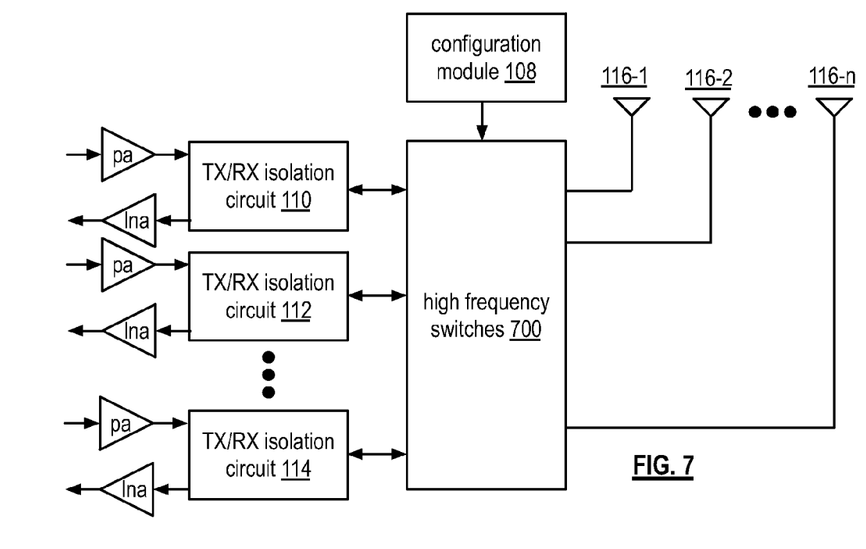
FIG. 7 is a schematic block diagram of another embodiment of a wireless communication device front end in accordance with the present disclosure.

FIG. 7 is a schematic block diagram of another embodiment of a wireless communication device front end that includes the power amplifiers, the low noise amplifiers, the configuration module 108, the transmit/receive isolation circuits 110-114, high frequency switches 700, and the antennas 116-1 through 116-n. The high frequency switches 700 allow the antennas to be coupled to the transmit/receive isolation circuits to support power combining, beamforming, and a combination thereof. For instance, in a power combining and beamforming mode, the configuration module 108 couples, via sets of high frequency switches, sets of antennas to sets of transmit/receive isolation circuits.

Figure 7A:
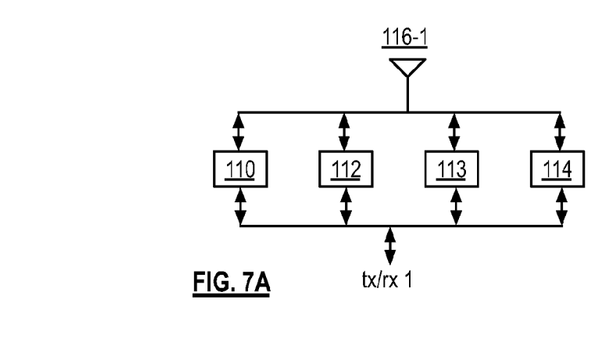
FIG. 7A is a schematic block diagram of an example of an antenna configuration in accordance with the present disclosure.

FIG. 7A is a schematic block diagram of an example of an antenna configuration for a power combining antenna configuration. In this example, the configuration module 108 couples one antenna to the transmit/receive isolation circuits. The transmit output circuit (not shown in this figure) splits an outbound signal that is provided via the power amplifiers to the transmit/receive isolation circuits 110-114. In addition, the receive input circuit (not shown in this figure) combines the inbound signals received from the low noise amplifiers via the transmit/receive isolation circuits 110-114.

Figure 7B:
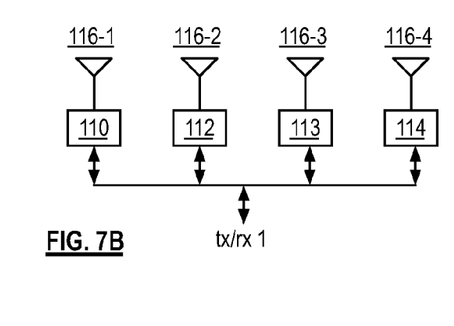
FIG. 7B is a schematic block diagram of another example of an antenna configuration in accordance with the present disclosure.

FIG. 7B is a schematic block diagram of another example of an antenna configuration for a diversity antenna configuration. In this example, the configuration module 108 couples the antennas individually to the transmit/receive isolation circuits. The transmit output circuit (not shown in this figure) splits an outbound signal that is provided via the power amplifiers to the transmit/receive isolation circuits 110-114. In addition, the receive input circuit (not shown in this figure) combines the inbound signals received from the low noise amplifiers via the transmit/receive isolation circuits 110-114.

Figure 7C:
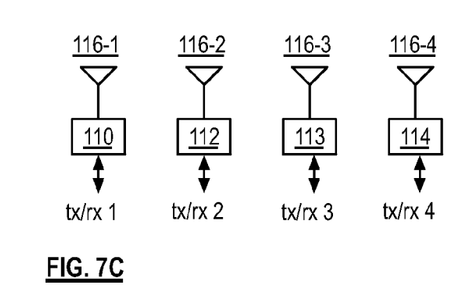
FIG. 7C is a schematic block diagram of another example of an antenna configuration in accordance with the present disclosure.

FIG. 7C is a schematic block diagram of another example of an antenna configuration for a beamforming and/or MIMO antenna configuration. In this example, the configuration module 108 couples the antennas individually to the transmit/receive isolation circuits. The transmit output circuit (not shown in this figure) sends separate outbound signals of the power amplifiers to the transmit/receive isolation circuits 110-114. In addition, the receive input circuit (not shown in this figure) receives separate inbound signals received from the low noise amplifiers via the transmit/receive isolation circuits 110-114.

Figure 7D:
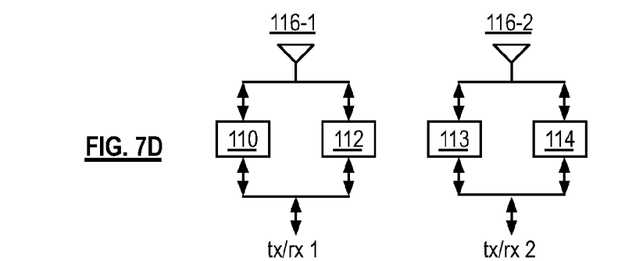
FIG. 7D is a schematic block diagram of another example of an antenna configuration in accordance with the present disclosure.

FIG. 7D is a schematic block diagram of another example of an antenna configuration for a power combining and beamforming and/or MIMO antenna configuration. In this example, the configuration module 108 couples one antenna to two transmit/receive isolation circuits and another antenna to two different transmit/receive isolation circuits. The transmit output circuit (not shown in this figure) sends separate outbound signals of the power amplifiers to two sets of the transmit/receive isolation circuits 110-114. In addition, the receive input circuit (not shown in this figure) receives separate inbound signals received from the low noise amplifiers via the sets of transmit/receive isolation circuits 110-114.

Figure 8:
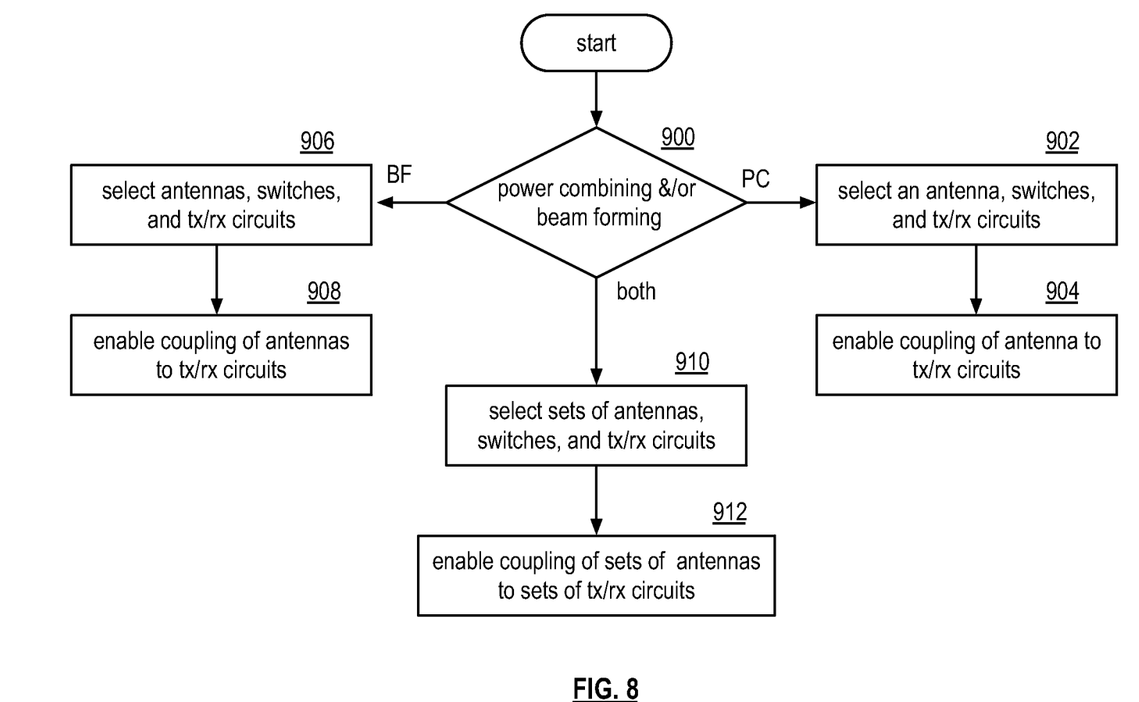
FIG. 8 is a logic diagram of an example of a method for configuring a wireless communication device front end in accordance with the present disclosure.

FIG. 8 is a logic diagram of an example of a method for configuring a wireless communication device front end that begins at step 900 where one or more processing devices of the wireless communication device (e.g., processing module, baseband processing module, configuration module, etc.) determines whether to place the wireless communication device in a power combining mode or a beamforming mode. The method continues at step 902 for the power combining mode where the process device selects one of the antennas, selects a set of high frequency switches, and selects a set of transmit/receive isolation circuits. The selection of the set of transmit/receive isolation circuits may be based on the type of circuit (e.g., a magnetic field biased circulator and/or a transformer). The method continues at step 904 where the processing devices enables coupling of the set of transmit/receive isolation circuits to the antenna via the set of high frequency switches.

The method continues at step 906 for the beamforming mode where the processing devices selects a set of antennas, selects a set of high frequency switches, and selects a set of transmit/receive isolation circuits. The method continues at step 908 where the processing device enables coupling of the set of transmit/receive isolation circuits to the set of antennas via the set of high frequency switches. In addition, the beamforming mode may further include the processing device enabling one or more adjustable phase shifters that are coupled to one or more transmit/receive isolation.

The method continues at step 910 for a power combining and beamforming mode where the processing device selects sets of antennas, selects sets of high frequency switches, and selects sets of transmit/receive isolation circuits. The method continues at step 912 where the processing device enables coupling of the sets of transmit/receive isolation circuits to the sets of antennas via the sets of high frequency switches.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A configurable wireless communication device front end comprising:
   a plurality of antennas;
   a plurality of transmit/receive isolation circuits;
   a semiconductor substrate supporting:
      a plurality of power amplifiers; and
      a plurality of low noise amplifiers, wherein a transmit/receive isolation circuit of the plurality of transmit/receive isolation circuits is coupled to a power amplifier of the plurality of power amplifiers and to a low noise amplifier of the plurality of low noise amplifiers;
   a plurality of high frequency switches; and
   a configuration module configured to:
      in a power combining mode, couple, via a set of high frequency switches of the plurality of high frequency switches, an antenna of the plurality of antennas to a set of transmit/receive isolation circuits of the plurality of transmit/receive isolation circuits; and
      in a beamforming mode, couple, via a second set of high frequency switches of the plurality of high frequency switches, a set of antennas of the plurality of antennas to a second set of transmit/receive isolation circuits of the plurality of transmit/receive isolation circuits.

2. The configurable wireless communication device front end of claim 1, wherein the transmit/receive isolation circuit comprising:
   a magnetic field biased circulator.

3. The configurable wireless communication device front end of claim 1, wherein the transmit/receive isolation circuit comprising:
   a transformer having a center-tapped first winding and a second winding, wherein a first end of the center-tapped first winding is coupled to an antenna of the plurality of antennas via a high frequency switch of the plurality of high frequency switches, wherein a center-tap of the center-tapped first winding is coupled to the power amplifier, and the second winding is coupled to the low noise amplifier.

4. The configurable wireless communication device front end of claim 1 further comprising:
   a second transmit/receive isolation circuit of the plurality of transmit/receive isolation circuits is coupled to a second power amplifier of the plurality of power amplifiers and to a second low noise amplifier of the plurality of low noise amplifiers, wherein the transmit/receive isolation circuit includes a first transformer and the second transmit/receive isolation circuit includes a second transformer, wherein each of the first and second transformers includes a center-tapped first winding and a second winding,
   wherein a first end of the center-tapped first winding of the first transformer is coupled to a first antenna of the plurality of antennas via a first high frequency switch of the plurality of high frequency switches, wherein a center-tap of the center-tapped first winding of the first transformer is coupled to the power amplifier, and the second winding of the first transformer is coupled to the low noise amplifier,
   wherein a first end of the center-tapped first winding of the second transformer is coupled to a second antenna of the plurality of antennas via a second high frequency switch of the plurality of high frequency switches, wherein a center-tap of the center-tapped first winding of the second transformer is coupled to the second power amplifier, and the second winding of the second transformer is coupled to the second low noise amplifier, and
   wherein a second end of the center-tapped first winding of the first transformer is coupled to a second end of the center-tapped first winding of second first transformer such that transmit power is not dissipated to ground.

5. The configurable wireless communication device front end of claim 1, wherein the configuration module is further configured to:
   in a power combining and beamforming mode, couple, via sets of high frequency switches of the plurality of high frequency switches, sets of antennas of the plurality of antennas to sets of transmit/receive isolation circuits of the plurality of transmit/receive isolation circuits.

6. The configurable wireless communication device front end of claim 1 further comprising:
   the semiconductor substrate further supporting the plurality of transmit/receive isolation circuits.

7. The configurable wireless communication device front end of claim 1 further comprising:
   one or more adjustable phase shifters coupled to one or more transmit/receive isolation circuits of the plurality of transmit/receive isolation circuits, wherein the one or more adjustable phase shifters are enabled in the beamforming mode by the configuration module.

8. The configurable wireless communication device front end of claim 1 further comprising:
   a receive power combining circuit configured to combine, in the power combining mode, a set of inbound signals received from a set of low noise amplifiers of the plurality of low noise amplifiers coupled to the set of transmit/receive isolation circuits.

9. A method for configuring a wireless communication device, the method comprising:
   determining, by one or more processing devices of the wireless communication device, a power combining mode or a beamforming mode;
   when the power combining mode is determined:
      selecting:
         an antenna of a plurality of antennas;
         a set of high frequency switches of a plurality of high frequency switches;
         a set of transmit/receive isolation circuits of a plurality of transmit/receive isolation circuits, wherein a transmit/receive isolation circuit of the plurality of transmit/receive isolation circuits is coupled to a power amplifier of a plurality of power amplifiers and to a low noise amplifier of a plurality of low noise amplifiers; and
      enabling coupling of the set of transmit/receive isolation circuits to the antenna via the set of high frequency switches; and
   when the beamforming mode is determined:
      selecting:
         a set of antennas of the plurality of antennas;
         a second set of high frequency switches of the plurality of high frequency switches;
         a second set of transmit/receive isolation circuits of the plurality of transmit/receive isolation circuits; and
      enabling coupling of the second set of transmit/receive isolation circuits to the set of antennas via the second set of high frequency switches.

10. The method of claim 9, wherein at least one of the selecting in the power combining mode and the beamforming mode comprising:

selecting a type of transmit/receive isolation circuit, wherein the type of transmit/receive isolation circuit includes:
a magnetic field biased circulator; and
a transformer having a center-tapped first winding and a second winding, wherein a first end of the center-tapped first winding is coupled to an antenna of the plurality of antennas via a high frequency switch of the plurality of high frequency switches, wherein a center-tap of the center-tapped first winding is coupled to the power amplifier, and the second winding is coupled to the low noise amplifier.

11. The method of claim 9 further comprising:
determining a power combining and beamforming mode, wherein, in the power combining and beamforming mode:
selecting:
sets of antennas of the plurality of antennas;
sets of high frequency switches of the plurality of high frequency switches;
sets of transmit/receive isolation circuits of the plurality of transmit/receive isolation circuits; and
enabling coupling of the sets of transmit/receive isolation circuits to the sets of antennas via the sets of high frequency switches.

12. The method of claim 9 further comprising:
enabling one or more adjustable phase shifters that are coupled to one or more transmit/receive isolation circuits of the plurality of transmit/receive isolation circuits when in the beamforming mode.

13. The method of claim 9 further comprising:
enabling power combining of a set of inbound signals received from a set of low noise amplifiers of the plurality of low noise amplifiers coupled to the set of transmit/receive isolation circuits when in the power combining mode.

14. A configurable wireless communication device comprising:
a baseband processing module configured to:
convert outbound data into an outbound symbol stream; and
convert an inbound symbol stream into inbound data;
a transmitter section configured to convert the outbound symbol stream into an outbound signal, wherein the transmitter section includes a plurality of power amplifiers;
a receiver section configured to convert an inbound signal into the inbound symbol stream, wherein the receiver section includes a plurality of low noise amplifiers;
an antenna;
a plurality of transmit/receive isolation circuits, wherein a transmit/receive isolation circuit of the plurality of transmit/receive isolation circuits is coupled to a power amplifier of the plurality of power amplifiers and to a low noise amplifier of the plurality of low noise amplifiers;
a plurality of high frequency switches; and
a configuration module configured to, in a power combining mode, couple, via a set of high frequency switches of the plurality of high frequency switches, the antenna to a set of transmit/receive isolation circuits of the plurality of transmit/receive isolation circuits, wherein a number of the transmit/receive isolation circuits in the set of transmit/receive isolation circuits is based on a desired combined transmit power.

15. The configurable wireless communication device of claim 14 further comprises:
a plurality of antennas that includes the antenna; and
the configuration module is further configured to, in a beamforming mode, couple, via a second set of high frequency switches of the plurality of high frequency switches, a set of antennas of the plurality of antennas to a second set of transmit/receive isolation circuits of the plurality of transmit/receive isolation circuits.

16. The configurable wireless communication device of claim 14, wherein the transmit/receive isolation circuit comprising one of:
a magnetic field biased circulator; and
a transformer having a center-tapped first winding and a second winding, wherein a first end of the center-tapped first winding is coupled to an antenna of the plurality of antennas via a high frequency switch of the plurality of high frequency switches, wherein a center-tap of the center-tapped first winding is coupled to the power amplifier, and the second winding is coupled to the low noise amplifier.

17. The configurable wireless communication device of claim 14 further comprising:
a second transmit/receive isolation circuit of the plurality of transmit/receive isolation circuits is coupled to a second power amplifier of the plurality of power amplifiers and to a second low noise amplifier of the plurality of low noise amplifiers, wherein the transmit/receive isolation circuit includes a first transformer and the second transmit/receive isolation circuit includes a second transformer, wherein each of the first and second transformers includes a center-tapped first winding and a second winding,
wherein a first end of the center-tapped first winding of the first transformer is coupled to a first antenna of the plurality of antennas via a first high frequency switch of the plurality of high frequency switches, wherein a center-tap of the center-tapped first winding of the first transformer is coupled to the power amplifier, and the second winding of the first transformer is coupled to the low noise amplifier,
wherein a first end of the center-tapped first winding of the second transformer is coupled to a second antenna of the plurality of antennas via a second high frequency switch of the plurality of high frequency switches, wherein a center-tap of the center-tapped first winding of the second transformer is coupled to the second power amplifier, and the second winding of the second transformer is coupled to the second low noise amplifier, and
wherein a second end of the center-tapped first winding of the first transformer is coupled to a second end of the center-tapped first winding of second first transformer such that transmit power is not dissipated to ground.

18. The configurable wireless communication device of claim 14, wherein the configuration module is further configured to:
in a power combining and beamforming mode, couple, via sets of high frequency switches of the plurality of high frequency switches, sets of antennas of a plurality of antennas to sets of transmit/receive isolation circuits of the plurality of transmit/receive isolation circuits.

19. The configurable wireless communication device of claim 14 further comprising:
a semiconductor substrate supporting the plurality of transmit/receive isolation circuits, the plurality of power amplifiers, and the plurality of low noise amplifiers.

20. The configurable wireless communication device of claim 14 further comprising at least one of:
- one or more adjustable phase shifters coupled to one or more transmit/receive isolation circuits of the plurality of transmit/receive isolation circuits, wherein the one or more adjustable phase shifters are enabled in the beam-forming mode by the configuration module; and
- a receive power combining circuit configured to combine, in the power combining mode, a set of inbound signals received from a set of low noise amplifiers of the plurality of low noise amplifiers coupled to the set of transmit/receive isolation circuits.

* * * * *